March 3, 1964 R. A. DALY 3,123,368
CHUCK
Filed May 16, 1961

INVENTOR.
ROBERT A. DALY
BY Frank C. Parker
David E. Dougherty
ATTORNEYS

United States Patent Office 3,123,368
Patented Mar. 3, 1964

3,123,368
CHUCK
Robert A. Daly, Greece, N.Y., assignor to Bausch & Lomb Incorporated, Rochester, N.Y., a corporation of New York
Filed May 16, 1961, Ser. No. 110,492
5 Claims. (Cl. 279—1)

This invention relates to a novel chuck and more particularly to a novel chuck for holding relatively small cylindrical test objects of the type used in fluorometers.

Fluorometers are used for measuring the amount of fluorescence emitted by test objects under various analytical procedures, and also to determine quantitatively the amount of gamma or X-rays to which a body has been exposed. A fluorometer of this type is disclosed in U.S. Patent No. 2,950,391, issued to C. H. Brumley and R. J. Meltzer.

Fluorometers of the type disclosed in the aforementioned patent are arranged to measure the fluorescence of a relatively small test object. The test object is preferably a small glass rod, about 1 mm. in diameter and 6 mm. long. Accurate measurements of fluorescence produced by such a test object are difficult to obtain and require a relatively high degree of accuracy in positioning the test object during fluorescence.

A novel chuck according to the present invention is arranged for holding a small cylindrical test object within a hollow reflector. The chuck is arranged to grip the test object at its lower end in a manner that minimizes the area covered by the chuck, and maximizes the area available for emitting fluorescence.

Advantageously, the chuck disclosed herein facilitates rapid loading and unloading of the test object, and facilitates accurate positioning of the test object for measurement purposes. The chuck is simple in construction, relatively inexpensive to manufacture and durable in service. Furthermore reflecting means may be provided to gather a maximum amount of the fluorescence and direct the emitted light to a sensor.

Briefly, a chuck according to the invention comprises a slender rod and a receptacle. The receptacle has a concave surface or wall, and a relatively flat base which is generally perpendicular to the wall. Means are provided for biasing the rod in a direction toward the concave surface whereby a generally cylindrical test object is clamped in the chuck by being forced against the concave surface. A cam is arranged to bias the rod in a direction away from the concave surface, to thereby open the chuck for receiving or releasing the test object. The base of the receptacle may be provided with an aperture therein to allow light to pass through the aperture to fluoresce the sample.

The invention will now be described in more detail in connection with the accompanying drawings, in which.

Figure 1:
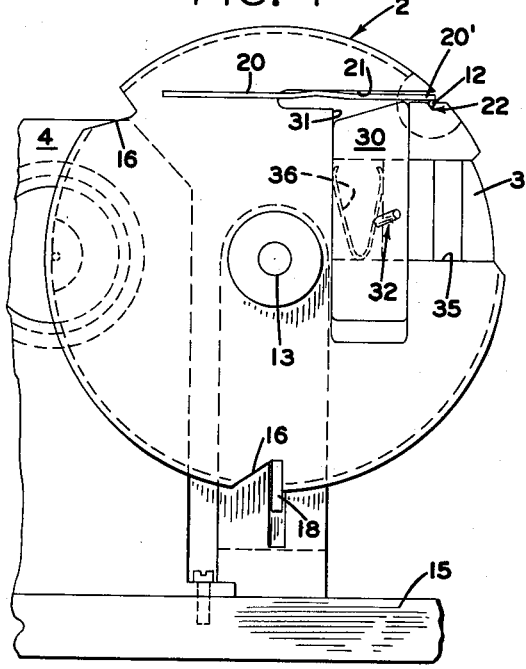
FIG. 1 is a plan view of a novel chuck according to the invention.
Figure 2:
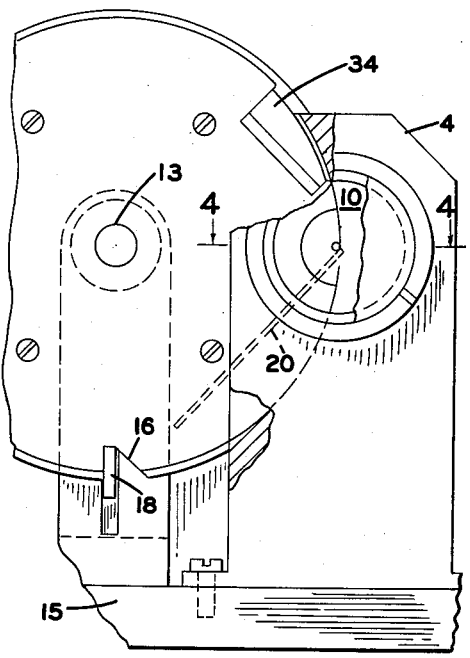
FIG. 2 is a plan view of the device shown in FIG. 1 taken from the opposite side, wherein the chuck has been rotated.
Figure 4:
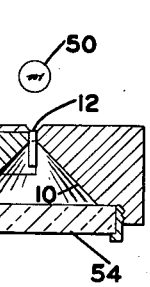
FIG. 4 is a cross sectional view taken along the line 4—4 in FIG. 2.
Figure 3:
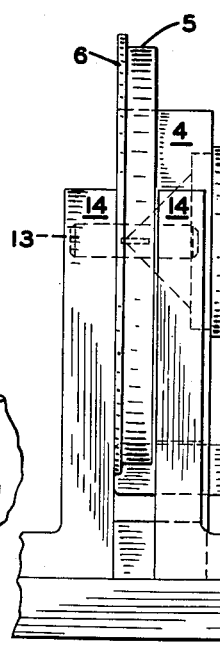
FIG. 3 is a side elevational view of the device shown in FIGS. 1 and 2.
Figure 5:
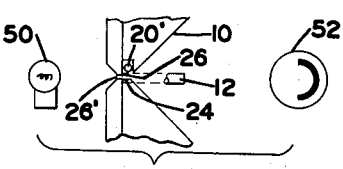
FIG. 5 is a schematic view illustrating the arrangement for measuring a test object.
Figure 6:
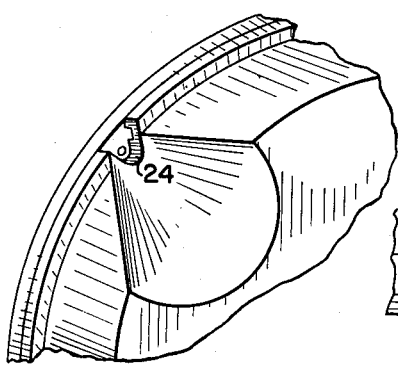
FIG. 6 is a perspective view illustrating the concave portion of the chuck which is adapted to receive the test object.

Referring now more particularly to the drawings, a preferred embodiment of the invention is described in connection with a fluorometer. The fluorometer includes a rotatable disc 2 which is journaled in a stationary member 4. The disc 2 which has a novel chuck therein, includes a relatively thick front portion 5 and a thin backing plate 6. The backing plate 6 extends beyond the edge of the portion 5 to form a flange which is journaled in the stationary member 4. The stationary member 4 includes a reflector 10 wherein a test object 12 is positioned by the disc 2 for measuring purposes.

A novel chuck according to the invention comprises a slender rod 20 and a receptacle 22. The rod 20 may be considered to be a relatively thin wire spring. The receptacle 22 has a generally concave wall 24 open on one side thereof and a base 26 which is a generally flat plate at the bottom of the wall 24. The base 26 is generally perpendicular to the wall 24. The wall 24 may be V shaped or generally cylindrical, however in the preferred embodiment it is V shaped, having an opening extending along the length of the wall and opposite the bottom of the V. The rod 20 is biased toward the concave wall 24 at its lower portion, i.e., near the base 26. Normally the rod 20 is made of resilient material and is fixed in a recess 21 in the disc 2. The rod is arranged in the recess so that its configuration will be bowed. The bowlike configuration biases one end 20' of the rod 20 toward the concave wall 24.

A release mechanism for opening the chuck to receive or release the test object 12 is arranged in the disc 2. The mechanism comprises a slide bar 30, and an actuator 34, interconnected by a pin and slot cam assembly 32. The slide bar 30 is reciprocally mounted within guide means 31 and is biased along the guide means 31 in a direction away from the rod 20 by the force exerted thereon by the resilient rod 20.

The actuator 34 is reciprocally arranged in guide means 35 and is biased outwardly by a spring 36. The actuator is reciprocable along an axis generally perpendicular to the slide bar 30. The pin and slot cam assembly 32 is arranged with the slot disposed at approximately a 45 degree angle to the direction of lateral and longitudinal movements of the actuator 34 and the slide bar 30. When the actuator 34 is moved in a lateral direction the pin and slot arrangement moves the slide bar in a longitudinal direction to thereby move the slide bar 30 by an amount approximately equal to the distance traveled by the actuator 34. This movement forces the slender rod 20 away from the receptacle 22 to thereby open the chuck.

The disc 2 is fixed to a shaft 13 and rotates thereon in order to move the chuck between the loading and testing positions. The shaft 13 is carried by a pair of upright members 14 which are fixed to a base 15 on opposite sides of the disc 2. Two detents 16 are formed on the outer peripheral edge of the disc 2 and are arranged to engage a dog 18 which is biased by a spring 17 against the disc 2, to thereby form a stop arrangement. The stop arrangement allows the disc to be rotated through an arc of approximately 120 degrees and holds the disc 2 in either the loading or testing position until the dog 18 is manually released to allow the position of the disc to be changed.

In operation, a test object 12 is held in the receptacle in an erect position by being forced against the wall 24 of the receptacle 22 by the slender rod 20. The object 12 is held at its lower portion thereof between the rod 20 and the receptacle wall 24, and abuts the base 26. This arrangement facilitates accurate positioning of the test object 12 within the reflector 10. Contact between the base 26 and the bottom of the test object 10 insures that a predetermined length of the test object 12 extends into the reflector 10. The test object 12 is thereby accurately positioned for measuring purposes.

The reflector 10 has a conical shape with its apex terminating in the relatively shallow receptacle 22. Part of the cone-shaped reflector 10 comprising a segment of the apex is formed in the disc 2. The remainder of the reflector comprising a matching segment of the apex and a frustum of the cone is formed in the stationary member 4. The respective parts of the reflector 10 are arranged to form a conical reflector which is concentric with an aperture 26' in the base 26 and coaxial with the concave cylindrical wall 24.

The receptacle 22 has sufficient depth to hold the test object 10 in an erect position, however, it is relatively shallow and allows the maximum area of the test object 10 to extend into the conical area. This arrangement maximizes the surface area fluoresced and thereby improves sensitivity of the measurement.

A source 50 of ultra violet light is arranged to irradiate the test object 12. The light is directed through the aperture 26' in the base 26 of the receptacle 22, and exits the sample to a fluorescent state. The fluorescence is directed by the conical reflector 10 to a photosensor 52.

The reflector 10 is shown as being conical, however, it may be formed in other shapes such as an inverted pyramid having a plurality of flat sides. The reflecting surface will generally converge to a point where the test object is located, so that a maximum amount of light emitted by the test object 12 is gathered by the reflector and directed to the sensor 52.

Across the top of the reflector 10 is a filter 54 which selectively passes certain light waves only. The light waves passed are in the visible region of the spectrum and are due to fluorescence of the test object 12. The ultra violet light is effectively absorbed by the filter 54 and therefore does not impinge on the sensor 52. The sensor 52 is arranged to receive the fluorescent waves that are transmitted through the filter 54 to provide a signal which is an indication of a quantitative reading.

What is claimed is:

1. A chuck comprising a slender resilient rod and a receptacle, said receptacle defining a generally V-shaped concave surface and including a generally perpendicular base which is perpendicular to said concave surface, said receptacle adapted to receive a generally cylindrical test object therein, said base defining an aperture therein to allow light to pass through the aperture to fluoresce the sample, means biasing said rod in a direction toward said concave surface to thereby force the test object against said concave surface, and cam means for biasing said rod in a direction away from said concave surface to thereby open said chuck for receiving or releasing the test object.

2. A chuck comprising a slender rod and a receptacle, said receptacle defining a generally V-shaped concave surface and including a generally perpendicular base which is perpendicular to said concave surface, said receptacle adapted to receive a generally cylindrical test object therein, means biasing said rod in a direction toward said concave surface to thereby force the test object against said concave surface, a slide bar, and a pin and slot cam assembly, said slide bar actuated by said pin and slot assembly for biasing said rod in a direction away from said concave surface to thereby open said chuck for receiving or releasing the test object.

3. A chuck comprising a resilient slender rod and a receptacle, said receptacle defining a generally cylindrical concave surface and including a generally perpendicular base which is perpendicular to said concave surface, said receptacle adapted to receive a generally cylindrical test object therein, means biasing said rod in a direction toward said concave surface to thereby force the test object against the concave surface, a slide bar, an actuator, a pin and slot cam assembly interconnecting said slide bar and said actuator, and a spring, said spring biasing said actuator in a direction away from said slide bar to thereby bias said slide bar away from said concave surface, and said slide bar actuated by said pin and slot assembly to bias said rod in a direction away from said concave surface when it is desired to open said chuck for receiving or releasing the test object.

4. A chuck comprising a resilient slender rod, a receptacle, and a conical segment including a reflective coating thereon, said receptacle defining a generally cylindrical concave surface and including a generally perpendicular base which is perpendicular to said concave surface, said receptacle adapted to receive a generally cylindrical test object therein, said segment located in axial alignment with said receptacle with its apex in contiguous relation with an upper portion of said concave surface, means biasing said rod in a direction toward said concave surface to thereby force the test object against the concave surface whereby said test object is received in said receptacle and extends upwardly into said conical segment, a slide bar, an actuator, a pin and slot cam assembly interconnecting said slide bar and said actuator, and a spring, said spring biasing said actuator in a direction away from said slide bar to thereby bias said slide bar away from said concave surface, and said assembly biasing said rod in a direction away from said concave surface when said actuator is forced inwardly against the bias of said spring to thereby open said chuck for receiving or releasing the test object.

5. A chuck comprising a resilient slender rod, and a receptacle, in combination with reflecting means, said reflecting means including a conical segment having a reflective portion thereon, said conical segment located in coaxial alignment with said receptacle and having an apex of said segment in contiguous relation with an upper portion of said receptacle, and a second portion comprising a segment of a cone, and means for bringing said first portion of said segment into superimposed contiguous relation with said second portion to thereby form a conical reflector, said receptacle defining a generally cylindrical concave surface and including a generally perpendicular base which is perpendicular to said concave surface, said receptacle adapted to receive a generally cylindrical test object therein, and means biasing said rod in a direction toward said concave surface to thereby force the test object against concave surface whereby said test object is received in said receptacle and extends upwardly in axial alignment into said conical reflector, a slide bar, an actuator, a pin and slot cam assembly interconnecting said slide bar and said actuator, and a spring biasing said actuator in a direction away from said slide bar to thereby bias said slide bar away from said concave surface, and said assembly biasing said rod in a direction away from said concave surface when said actuator is forced inwardly against the bias of said spring to thereby open said chuck for receiving or releasing the test object.

References Cited in the file of this patent
UNITED STATES PATENTS

| | | |
|---|---|---|
| 930,406 | McDonald | Aug. 10, 1909 |
| 2,803,877 | Belanger | Aug. 27, 1957 |